United States Patent [19]

Cecchin et al.

[11] Patent Number: 5,159,023

[45] Date of Patent: Oct. 27, 1992

[54] FUNCTIONALIZED POLYMERS FROM METALLATED CRYSTALLINE COPOLYMERS OF ALPHA-OLEFINS WITH DIENES AND PROCESS FOR PREPARING SAME

[75] Inventors: Giuliano Cecchin, Ferrara, Italy; Anthony J. DeNicola, Newark, Del.

[73] Assignee: Himont Incorporated, Wilmington, Del.

[21] Appl. No.: 505,624

[22] Filed: Apr. 6, 1990

[30] Foreign Application Priority Data

Apr. 6, 1989 [IT] Italy .................................. 20039A/89

[51] Int. Cl.$^5$ .............................................. C08F 8/00
[52] U.S. Cl. .................................. 525/250; 525/314; 525/315; 525/316
[58] Field of Search ................ 525/250, 314, 315, 316

[56] References Cited

U.S. PATENT DOCUMENTS

| | | |
|---|---|---|
| 3,703,566 | 11/1972 | Duck et al. . |
| 3,976,628 | 8/1976 | Halasa et al. ............... 525/316 |
| 4,107,238 | 8/1978 | Roper et al. ................ 525/316 |
| 4,707,521 | 11/1987 | Esneault et al. . |
| 4,761,456 | 8/1988 | Lund et al. ................. 525/316 |
| 4,786,689 | 11/1988 | Lund et al. . |

Primary Examiner—Bernard Lipman

[57] ABSTRACT

Functionalized polymers obtained from metallated crystalline copolymers of one or more alpha-olefins with minor proportions of a diene by reaction with monomers polymerizable of anionic methods or with compounds that react with the metallated copolymer.

The metallated copolymer is obtained by reaction of the olefin copolymer with organometallic compounds of lithium, in suspension in an inert solvent.

The lithiation stage and the subsequent polymer modification reaction take place in inert hydrocarbon suspension at a temperature below that of the swelling point of the starting copolymer.

9 Claims, No Drawings

FUNCTIONALIZED POLYMERS FROM METALLATED CRYSTALLINE COPOLYMERS OF ALPHA-OLEFINS WITH DIENES AND PROCESS FOR PREPARING SAME

DESCRIPTION

The present invention relates to functionalized polymers obtained from crystalline copolymers of one or more alpha-olefins with dienes and a method for preparing same.

As is known, polyolefins and their corresponding crystalline copolymers, although possessing good physicomechanical properties and excellent chemical resistance, lack highly desirable properties, such as varnishability, dyeing, adhesion, and compatibility with other polymers or inorganic substrates because of their apolar and saturated hydrocarbon nature.

Techniques for modifying the polyolefins have been used for long time to eliminate this disadvantage such as creating free radicals on the polymer chain to make the attachment of polymerizable monomers by the radical route possible.

Among the techniques most commonly used, are the mechanochemical routes, the use of peroxides or other chemical free radical generators and radiation treatment, such as electron, X-ray, UV ray and ionizing radiation.

However, in addition to the desired graft or functionalized polymer, each of these techniques present the disadvantage of also providing a series of uncontrollable and undesirable secondary reactions, such as degradation, crosslinking, and branching of the polymer itself.

The functionalization of unsaturated polymers without excessive degradation is known, for example polybutadiene and polyisoprene or elastomeric terpolymers consisting of for example propylene, ethylene and dienes, by metallating the polymer chain with lithiumalkyls and suitable activators and subsequent reaction of the metallated polymer with anionically polymerizable monomers (see, A. F. Halasa et al., J. Polym. Sci. Chem. Ed. 14:497, 1976; J. C. Falk et al., J. Rubber Chem. Techn. 46:1044, 1973; U.S. Pat. No. 3,703,566).

These reactions are conducted in solution, with the well known disadvantages associated with this technique, for example, the impossibility of working with high concentrations of polymer without an intolerable increase in the viscosity of the reaction mass and resulting difficulty in agitation and heat exchange.

Grafted crystalline polymers of one or more alpha-olefins with minor amount of a diene, obtained by metallation and subsequent grafting reaction conducted under conditions in which the polymer is insoluble in the reaction medium (a necessary condition in order to be able to operate with elevated quantities of material per unit of volume and therefore in an economically advantageous way) have not hitherto been known.

Surprisingly it has now been found that it is possible to obtain new functionalized polymers starting from crystalline copolymers of ethylene and/or alpha-olefins with dienes, conjugated or not, with elevated levels of modification and graft conversion, by conducting both the metallation reaction and that of the modification of the metallated copolymer in suspension in an inert hydrocarbon medium at a temperature below that of the swelling point of the copolymer.

Crystalline olefin copolymers useful in the preparation of the metallated and functionalized polymers of the invention are copolymers of $CH_2=CHR$ olefins in which R is hydrogen or an alkyl radical with 1–6 carbon atoms with conjugated and non-conjugated dienes, containing 80 to 99%, preferably 90 to 98% by weight olefin and from 1 to 20%, preferably from 2 to 10% by weight diene. The copolymers have melting point of over 100° C., X-ray crystallinity of more than 20%, and an intrinsic viscosity, measured in tetrahydronaphthalene at 135° C., of between 0.5 and 6 dl/g. The copolymers are preferably used in the form of particles of regular geometric form, especially spheroidal particles having a diameter of from 50 to 5,000 μm and restricted granulometric distribution. The bulk density of the spheroidal particles is generally from 0.35 to 0.5 g/cc.

The conjugated dienes especially suitable for the preparation of the copolymers are 1,3-butadiene and isoprene; the non-conjugated dienes include straight or branched chain, cyclic or dicyclic dienes, with one or both double bonds in terminal position. Representative examples of non-conjugated dienes are: 1,4-pentadiene; 1,5-hexadiene; 1,6-heptadiene; 1,7-octadiene; 1,8-nonadiene; 1,9-decadiene; 1,4-hexadiene; 4-methyl-1,5-hexadiene; 5-methyl-1,4-hexadiene; cyclohexadiene; cycloheptadiene; cyclooctadiene; dicyclopentadiene; norbornadiene; and ethylidenenorbornene.

The preferred conjugated diene is 1,3-butadiene, and the nonconjugated dienes are 1,4-hexadiene; 4-methyl-1,4-hexadiene; 5-methyl-1,4-hexadiene; and ethylidenenorbornene.

Representative crystalline copolymers are copolymers of ethylene or propylene or of propylene with minor proportions of ethylene and/or a higher alpha-olefins, such as 1-butene or 4-methyl-1-pentene containing from 2 to 10% diene.

The crystalline copolymers of olefins with dienes can be easily prepared by polymerization of the different monomers in the presence of Ziegler-Natta catalytic systems.

Copolymers of propylene with butadiene and the method of preparing them are described in U.S. Pat. No. 4,602,077.

Solvents usable during the metallation step include linear or cyclic aromatic and aliphatic hydrocarbons, such as toluene, xylene, hexane, heptane, decane, and cyclohexane.

Aliphatic hydrocarbons, such as hexane, heptane, and cyclohexane are preferably used.

Solvents suitable for the subsequent reaction of modification of the metallated copolymer may be the same ones as in the first step, or they may be replaced by other solvents which do not react with the polymer. In particular, it may be advantageous from the standpoint of the graft yield to partly or completely replace the solvent used in the first step with a polar solvent, for example, ethers and amines, such as ethyl ether, tetrahydrofuran, methyltetrahydrofuran, tetrahydropyran, diethyleneglycol dimethyl ether, crown ethers, 1,2-dipiperidineethane, and triethylamine. By a suitable selection of the polarity of the solvent, it is also possible to regulate the microstructure and the tacticity of the grafted polymer (see, e.g. A. Parry in Reactivity, Mechanism and Structure in Polymer Chemistry, pp. 366–369, John Wiley & Sons, N.Y. 1974; Encyclopedia of Polymer Science and Engineering, vol. 2, pp 27–36, John Wiley & Sons, N.Y., 1985).

The metallation reaction and the subsequent modification of the metallated copolymer are conducted under the same or different temperature conditions, but in all cases at a temperature below that of the swelling point of the starting copolymer.

The metallation temperature is generally between 0° and 70° C., preferably between 30° and 60° C., and the modification temperature is between −80° and 70° C., preferably between 0° and 60° C. One or more washings of the metallated polymer with solvents selected from among those suitable for the metallation or modification reaction are performed between the two steps for the purpose of eliminating any unreacted metallating agent.

Elimination of unreacted metallating agent is necessary in order to obtain good graft yields.

Organometallic lithium compounds of the general formula RLi, where R is an alkyl linear or branched, saturated or unsaturated cycloalkyl or aryl radical containing 1 to 18 carbon atoms, are used as metallating agents.

Representative examples of lithium compound are: methyl-lithium, n-butyllithium, sec-butyllithium isopropyllithium, tert-butyllithium, n-dodecyllithium, phenyllithium, and neopentyllithium. The quantity of lithium compound usable is from 0.2 to 5 mols per double bond present in the copolymer to be metallated, preferably from 0.5 to 2.

The metallated copolymer contains quantities of combined lithium expressed as grams atoms per 100 g of copolymer of between 0.01 and 0.5, preferably between 0.02 and 0.1.

To enhance the effectiveness of the metallation, it may be suitable to use the lithium compound together with one or more activating agents selected from among tertiary diamines, such as N,N,N',N'-tetramethylethylenediamine or N,N,N',N'-tetraethylethylenediamine, or from among compounds such as potassium ethoxide, potassium tert-butoxide, or potassium tert-amyloxide.

The metallating agent and the activator may be fed together or separately into the metallation reactor, or they may be precontacted in a separate reactor. The molar ratio between the lithium compound and the activator may range between 0.2 to 5, preferably between 0.5 and 2.

The graft copolymers are prepared either by the use of monomers capable of anionic polymerization or compounds reactive with the Li-C bond.

Illustrative examples are aromatic vinyl monomers such as styrene, alpha-methylstyrene, vinyltoluene, vinyl esters such as vinyl acetate or vinyl stearate, alkyl acrylates and methacrylates such as methyl acrylate, ethyl acrylate, n-butyl acrylate, methyl methacrylate, ethyl methacrylate, n-butyl methacrylate, stearyl methacrylate, glycidyl acrylate, glycidyl methacrylate, acrylonitrile and methacrylonitrile, acrylamide, isoprene, butadiene, caprolactam and ε-caprolactone, diisocyanates, such as phenylene and toluene diisocyanate, ketones, aldehydes, ethylene oxide, and propylene oxide.

The monomers may be used individually, in admixture, or in sequence to obtain grafts consisting of homopolymer, random copolymers, or block copolymers, respectively.

The molecular weight of the grafted polymer depends on the degree of metallation of the starting copolymer, the concentration of the polymerizable monomer, and the reaction time.

The polymerizable monomer may be introduced into the metallate polymer suspension in a single addition or in successive portions.

After a time sufficient for obtaining the degree of grafting desired, the reaction is stopped by addition of a substance which has active hydrogen, for example an alcohol or an acid, and the modified polymer may be recovered by filtration, centrifuging, or stripping of the solvent.

The graft polymer may be washed with a solvent selective for the monomer used for the grafting reaction.

.Compounds reactive with the Li-C bond of the metallated copolymer and which make it possible to obtain intermediates which provide functionalized materials with carboxyl or hydroxyl groups, by reaction with compounds containing active hydrogen, include compounds such as carbon dioxide and alkylene oxides. Other applicable functionalization methods include, for example, those described in Advances Polym. Sci. 56:70–80, 1984.

The functionalized materials have various applications. In particular, they can be used as such or as modifiers of polyolefins or as compatibilizing agents, for example of polypropylene with other polymers. For example, copolymers grafted with polystyrene are suitable for compatibilizing polypropylene with atactic, isotactic or syndiotactic polystyrene, or polypropylene with polyphenylene oxide and its alloys with polystyrene; copolymers grafted with polyacrylates and polymethacrylates are useful for compatibilizing polypropylene with polycarbonate, polyvinylidene chloride, polyvinyl chloride, and styrene-acrylonitrile resins; polymers grafted with polybutadiene or with butadiene-styrene copolymers are usable as compatibilizing agents for polyolefins with various other polymers.

The quantity of polymer grafted may vary within broad limits, depending on the applications for which they are intended. The quantity is generally between 1 and 80% by weight, or more especially between 20 and 60%. The quantity of reactive compound grafted depends on the degree of metallation of the copolymer, and it is generally between 0.1 and 10% by weight.

Compounds containing grafted carboxyl, hydroxyl or amine groups may be added to polypropylene to improve its varnishing property, dyeing property, adhesion to inorganic polar substrates, and compatibility with polar polymers such as polyamides, polyurethanes, and acrylic and epoxy resins.

The morphology, granulometric distribution, and bulk density of the functionalized copolymer particles are similar to those of the starting metallated copolymer.

The following examples are presented for illustrative purposes and do not limit the invention.

EXAMPLE 1

Equipment

The metallation and modification reactions of the starting copolymer were conducted in a single unit consisting of a 500-ml glass flask provided with magnetic agitator, thermometer, cooler, dropping funnel with three-way upper cock, pressure equalizer, and three-way cock closed by a rubber membrane.

All the glassware was previously dried in an oven at 120° C. for 12 hours and, after assembly, accurately flamed in a current of nitrogen, which was made anhydrous by successive passage through two columns filled respectively with alumina and molecular sieves, and it is then kept under a slight nitrogen excess pressure.

Metallation reaction

Twenty grams of propylene-butadiene copolymer consisting of spheroidal granules having a granulometry with 90% particles of between 300 and 1,000 μm and a tamped bulk density (ASTM D 1895) of 0.5 g/cc were introduced into the above described flask.

The main physicochemical characteristics of the copolymer were as follows:
content in 1,2-butadiene=2.1% by weight (IR analysis)
content in 1,4-butadiene=1.4% by weight (IR analysis)
melting point=141° C. (DSC)
intrinsic viscosity (IV)=1.76 dl/g (measured in tetrahydronaphthalene at 135° C.)
crystallinity=54% (determined by X-ray diffraction).

After that, 150 ml of cyclohexane that had been distilled on calcium hydride and stored in a storage vessel on metallic sodium were fed into a flask. The transfer of solvent from the storage vessel was done by pressuring the vessel with nitrogen and having the liquid pass into the flask through the rubber stopper of the three-way cock by means of an accurately flamed steel capillary tube.

The following materials were fed in sequence into a separate 250-ml flask, provided with magnetic agitator and thermometer, dried and flamed as in the foregoing case: 50 ml anhydrous cyclohexane, 12.9 mmol n-butyllithium (1.6 molar solution in hexane of Aldrich product used as such) and 12.9 mmols N,N,N',N'-tetramethylethylenediamine (TMDA; "very pure" Fluka product distilled over calcium hydride in a vacuum).

All operations were conducted under dry nitrogen flow.

After about 5 minutes of agitation at room temperature, the clear solution obtained was transferred into a flask containing the polymer suspension kept under agitation and previously brought up to 50° C.

The reaction was continued at 50° C. for 2 hours. At the end, the reaction mass was brought to 0° C., the liquid mass was eliminated by siphoning, and the polymer was washed four times with portions of 200 ml cyclohexane each time.

Grafting reaction with styrene

Into the flask containing the metallated copolymer, thermostated at 0° C., 200 ml cyclohexane and 10 ml tetrahydrofuran distilled on calcium hydride in a vacuum were fed in sequence.

Then 22 ml styrene rendered anhydrous and purified in the same way as the diamine was introduced into the dropping funnel.

Styrene was then added to the copolymer suspension, kept under agitation at 0° C., dropwise in about 3 hours. The reaction was continued at 0° C. under agitation for 24 hours.

The reaction was terminated at the end by addition of 4 ml methanol, and the suspension was poured into 2 liters of methanol kept under agitation at room temperature.

The crude grafted polymer thus obtained was separated from the liquid phase by filtration and was dried in the oven at 55° C. in a nitrogen current for 12 hours. 40 g of modified polymer was recovered.

A portion of this polymer was extracted in Kumagawa for 24 hours with boiling methylethylketone to remove ungrafted polystyrene.

The material insoluble in methylethylketone, consisting of grafted polymer granules of spheroidal morphology, had an intrinsic viscosity of 1.88 dl/g and a styrene content of 43.6% by weight.

The analyses were made by the following methods:
intrinsic viscosity: analysis conducted in tetrahydronaphthalene at 135° C.

% styrene by weight
analysis made by IR spectroscopy on polymer sheets of known thickness, applying calibration curves obtained from mechanical mixtures of the unmodified starting copolymer and polystyrene.

EXAMPLE 2

Example 1 was repeated, except that the metallation was conducted at 60° C. instead of 50° C.

The grafted polymer obtained after extraction with MEK (methylethylketone) had a spheroidal morphology, intrinsic viscosity of 1.87 dl/g, and a styrene content of 48.5% by weight.

EXAMPLE 3

Example 1 was repeated, except that the metallation was conducted at 25° C. instead of 50° C. The characteristics of the grafted copolymer extracted with MEK were as follows:
intrinsic viscosity=2.07 dl/g;
styrene content=22% by weight.

Comparative example 1

In this case, the suspension of the copolymer in cyclohexane was brought to 80° C. under agitation before addition of the alkyl-lithium.

After about 5 minutes, a considerable swelling of the copolymer was observed, and after about 15 minutes its complete dissolution, with formation of a highly viscous homogeneous mass which could not be stirred.

This example demonstrates that the use of temperatures at which there is a swelling or dissolution of the polymer to be metallated is not suitable for the preparation of metallated polymers.

EXAMPLE 4

Example 2 was repeated, except that the grafting reaction with styrene was conducted at 30° C. for 8 hours.

The characteristics of the grafted polymer of spheroidal granulometry extracted with MEK were the following:
IV=2.08 dl/g; styrene content=41% by weight.

EXAMPLE 5

Example 2 was repeated, except that the grafting reaction with styrene was conducted at 60° C. for 8 hours.

The characteristics of the grafted polymer of spheroidal granulometry extracted with MEK were the following:
IV=2.08 dl/g;
styrene content=50% by weight.

EXAMPLE 6

The method of example 2 was repeated using the ingredients of Example 1, except that sec-butyllithium was used instead of n-butyllithium.

The characteristics of the grafted polymer extracted with MEK were:

IV = 1.72 dl/g;
styrene content = 36% by weight.

EXAMPLES 7-9

In these examples, performed according to the method of Example 2 and the ingredients of Example 1, the quantities of n-butyllithium and TMDA fed during the lithiation phase were varied.

The experiments and their results are presented in Table 1.

TABLE 1

|  | Examples | | |
| --- | --- | --- | --- |
|  | 7 | 8 | 9 |
| LITHIATION | | | |
| Copolymer g | 20 | 20 | 20 |
| cc solvent | 200 | 200 | 200 |
| mmols n-BuLi | 25.8 | 12.9 | 6.45 |
| mmols TMDA | 12.9 | 25.8 | 12.9 |
| Temperature (°C.) | 60 | 60 | 60 |
| GRAFTING | | | |
| Styrene g | 20 | 20 | 20 |
| cc solvent | 200 | 200 | 200 |
| cc THF | 10 | 10 | 10 |
| Temperature (°C.) | 0 | 0 | 0 |
| Reaction time, Hours | 24 | 24 | 24 |
| Insol. in MEK (% styrene by weight) | 36.5 | 47.0 | 32 |
| IV (viscosity insoluble in MEK) | 1.66 | 1.9 | 2.09 |

EXAMPLE 10

In this case, the metallated copolymer prepared according to the method of Example 2 was modified, after washing and resuspension in cyclohexane and THF (200 amd 10 ml respectively), by subsequent treatment, first with styrene and then with methyl methacrylate.

The reaction with styrene (11 ml) was for 12 hours at 0° C.; addition of 10.6 ml methyl methacrylate then took place, and the reaction was continued for another 12 hours, still at 0° C. The grafted polymer, isolated and extracted in the usual way, had the following properties:

IV = 1.81 dl/g;
styrene content = 20% by weight
methyl methacrylate content = 4.4% by weight.

EXAMPLES 11-12 AND COMPARATIVE EXAMPLES 11C-12C

Mixtures in fused state were prepared between polypropylene (Moplen T 30S-HIMONT ITALIA) and polystyrene (Edistir FA-MONTEDIPE S.p.A.) in the presence or absence of the styrene graft copolymer prepared according to Example 5.

The mixtures were prepared in a Brabender type internal mixer according to the following operating methods: the components of the mixture, premixed dry, were loaded into the Brabender chamber kept at 200° C. and, after about 3 minutes of plasticizing, were processed for another 5 minutes at 200° C. at about 80 rpm.

The mixture was then discharged hot directly onto a steel die of dimensions 3.2×120×130 mm.

The moulding of the mixtures was done between two aluminum sheets in a Carver press under the following conditions.

The material was preheated in the press at 200° C. for 2 minutes and then subjected, still at 200° C., to a pressure of 200 bars for 3 minutes.

The mixture was then cooled to room temperature in about 20 minutes, still under pressure.

The compositions and properties of the various mixtures, determined according to ASTM standards, are presented in Table 2.

TABLE 2

|  | Example No. | | | |
| --- | --- | --- | --- | --- |
|  | 11 | 12 | 11C | 12C |
| Polystyrene (wt. %) | 20 | 60 | 20 | 60 |
| Grafted copolymer (wt. %) | 10 | 10 | — | — |
| Tensile stress (MPa) | 3 | 3.4 | 1.6 | 1.8 |
| Flex modulus (MPa) | 1420 | 1940 | 1420 | 1780 |
| Notched IZOD resilience at 23° C. (J/m) | 14.2 | 12.57 | 11.6 | 8.7 |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A process for the preparation of a graft copolymer of a crystalline copolymer of one or more $CH_2=CHR$ olefins, wherein R is hydrogen or an alkyl radical with 1-6 carbon atoms, with a diene, containing 80 to 99% by weight of olefins and 1 to 20% by weight diene, consisting essentially of reacting a metallated copolymer obtained by the reaction of the crystalline copolymer containing a diene, in suspension in an inert hydrocarbon medium and which has been maintained at a temperature below the swelling point of said copolymer, with an organometallic lithium compound of the formula RLi, in which R is an alkyl, a cycloalkyl or an aryl radical containing 1 to 18 carbon atoms, and an activating compound consisting of a compound selected from the group consisting of a tertiary diamine and a potassium alkoxide, from which unreacted lithium compound is removed, with monomer polymerizble by anionic mechanism or with compounds which react with the Li-C bond of the metallated copolymer, in suspension in an inert hydrocarbon medium at a temperature below the swelling point of the copolymer.

2. The process of claim 1, in which the polymerizable monomer is selected from the group consisting of styrene, acrylates and methacrylates, butadiene, and styrene butadiene mixtures.

3. The process of claim 1, in which the compound which reacts with the Li-C bond is selected from the group consisting of carbon dioxide and alkylene oxides.

4. The process of claim 1, wherein said graft copolymer contains 1-80% by weight of polymer graft polymerized thereto from monomer polymerizable by anionic mechanism.

5. The process of claim 1, wherein said graft copolymer contains 0.1-10% by weight of grafted reactive compound groups.

6. The process of claim 5, wherein said graft copolymer are obtained by reaction of the metallated copolymers with carbon dioxide or alkylene oxides and subsequent hydrolysis reaction to form respectively carboxyl and hydroxyl groups.

7. The process of claim 4, wherein said graft copolymers are in the form of spheroidal particles with a diameter of from 50 to 5,000 μm and with a bulk density of from 0.35 to 0.5 g/cc.

8. The process of claim 5, wherein said graft copolymers are in the form of spheroidal particles with a diameter of from 50 to 5,000 μm and with a bulk density of from 0.35 to 0.5 g/cc.

9. A manufactured article comprising the graft copolymer of claim 4.

* * * * *